March 12, 1940.    J. H. ONIONS    2,193,736
FLUID PRESSURE MOTOR
Filed Nov. 15, 1937    2 Sheets-Sheet 1
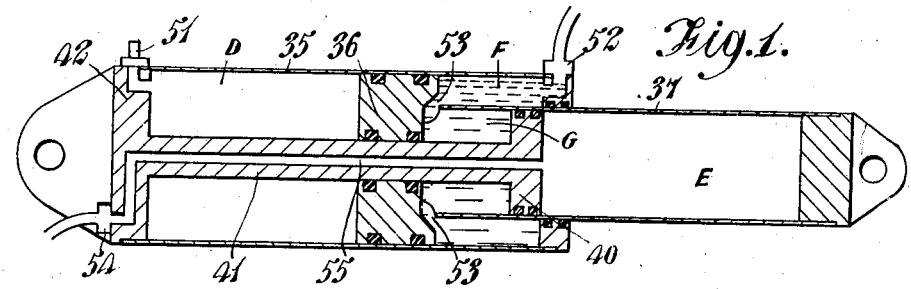
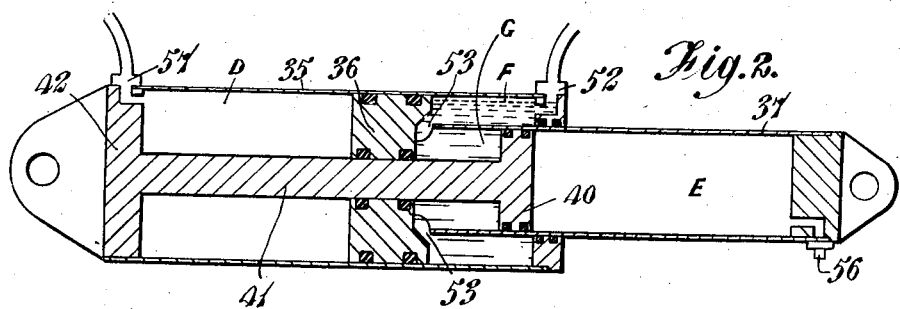
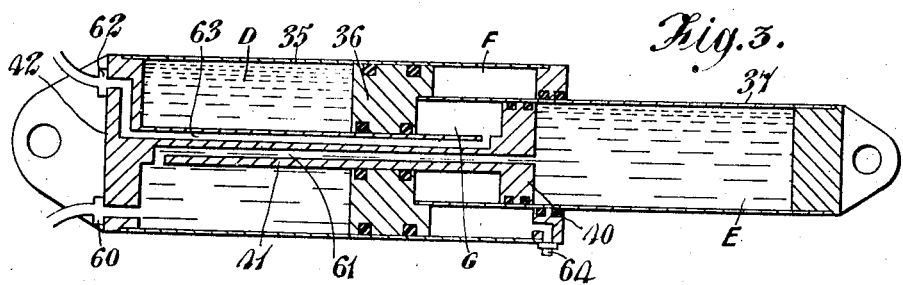
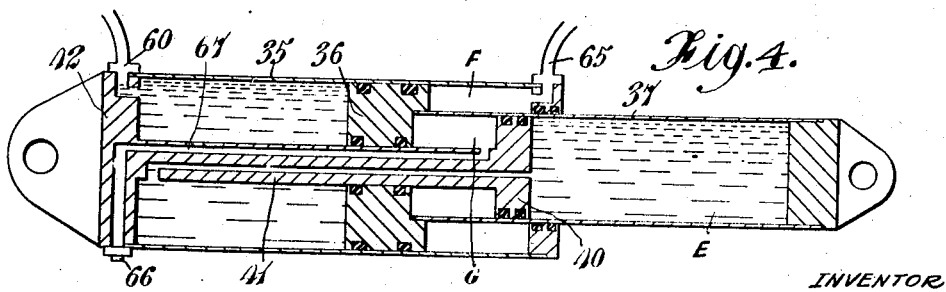
INVENTOR
J. H. Onions.
By Lacey & Lacey,
Attys Patented Mar. 12, 1940

2,193,736

UNITED STATES PATENT OFFICE 2,193,736

FLUID PRESSURE MOTOR

John Henry Onions, Leamington Spa, England

Application November 15, 1937, Serial No. 174,708
In Great Britain November 14, 1936

1 Claim. (Cl. 121—38)

(Granted under the provisions of sec. 14, act of
March 2, 1927; 357 O. G. 5)

This invention relates to fluid pressure motors, more particularly suitable for use in the control of movable members such as undercarriages, fairing doors, landing flaps and the like on aircraft.

The principal object of the invention is to provide a fluid pressure motor which is operated in one direction of movement by fluid pressure from an external source, and is operated in the other direction automatically. Another object is to provide a fluid pressure motor which will effect automatically the lowering of a retractable aircraft undercarriage to the landing position.

A further object of the invention is to provide a fluid pressure motor which is operated in one direction of movement only by fluid pressure from an external source, and is operated in the other direction either by resilient means within the motor, or by fluid pressure from an external source, such alternative fluid pressure operation being provided for use in the event of failure of the resilient means.

The invention will now be described with reference to the accompanying drawings, which show numerous examples of the invention.

In the drawings—

Figures 1 to 4 are diagrammatic sections of various forms of fluid pressure motors according to the invention.

Figures 1 to 4 show examples of fluid pressure motors according to the invention.

Figure 5:
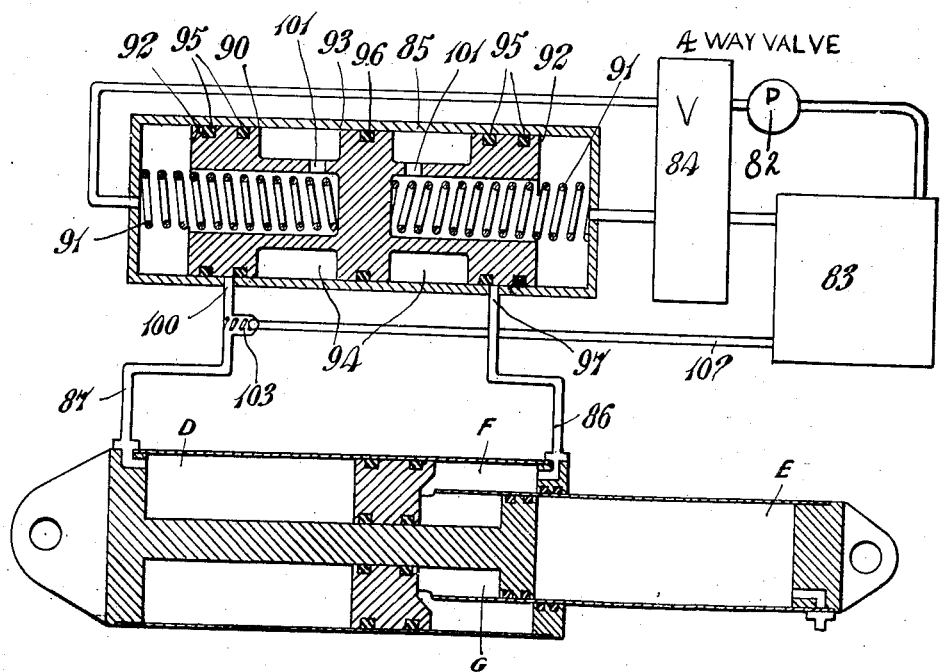
Figure 5 is a diagram of an operating system for use in association with the fluid pressure motors shown in Figure 2.

These motors each comprise a cylinder 35, a plunger 36 carried on a hollow stem 37, and a piston 40 sliding within the hollow plunger stem 37, the piston 40 being carried on a rod 41 secured to the head 42 of the motor cylinder 35.

This arrangement provides in the interior of the motor four separate chambers each bounded at its ends by surfaces associated respectively with the two elements of the motor, so that pressure acting in any one of the chambers tends to cause movement in one direction or the other of the motor elements.

Of the four chambers, one, D, is between the cylinder head 42 of the motor, and the plunger head, the second, E, is between the piston 40 and the outer end of the plunger stem, the third, F, is the annular space between the cylinder and the plunger stem, and the fourth, G, is within the plunger stem between the plunger head and the piston. It will be seen that excess pressure in chamber F or G will shorten the motor, whereas pressure in chamber D or E will extend it.

By feeding fluid under pressure into any one of these four chambers, or into the chambers F and G together or D and E together, the motor may be caused to extend or shorten. A quantity of compressed gas is contained in one chamber of either group, and such gas is further compressed by the feeding of pressure fluid to either or both of the chambers of the other group, thus storing energy which is utilized to operate the motor in the opposite direction. The second chamber of the first group is also connected to an external supply of pressure fluid, such fluid being utilized to operate the motor in the event of leakage of the compressed gas from the motor.

It has been found desirable in practice to provide such an alternative means for lowering the undercarriage of an aircraft, in case the primary means should become damaged and fail to operate. These motors are therefore primarily suitable for the operation of aircraft undercarriages, the motor being so arranged in the operating linkage that it acts to raise the undercarriage when moving in the direction in which it is acted on only by the liquid pressure from the external circuit, and lowers it when moving under the influence of the internal air pressure.

In each of the four figures the compressed air is contained in a different chamber, and liquid or gas under pressure is able to be supplied from an external source to both of the chambers of the other group, and to the second chamber of the first group.

Figure 1 shows a motor which is normally extended by air pressure in the chamber D, this chamber being fitted with a valve 51 for inflation purposes. Liquid enters the chamber F through the union 52, and the chambers F and G are connected by ports 53 so that liquid pressure acts in both these chambers to shorten the motor and compress the air in chamber D. Liquid may be fed through union 54 and passage 55 in the piston rod 41 to chamber E, to extend the motor in event of loss of the air pressure.

The motor shown in Figure 2 is also shortened by liquid pressure entering the chambers F and G through a union 52. In this motor the chamber E, which contains the air, is quite isolated from the other chambers of the motor, and is provided with an inflation valve 56. The chamber D receives the liquid pressure for extension in the event of failure of the air pressure, through a union 57.

The motor shown in Figure 3 is shortened by the internal air pressure acting in chamber F, extension of the motor being effected by liquid pressure entering the chamber D through the union 60, and acting in this chamber and chamber E. The liquid enters the latter chamber by passing through a passage 61 in the piston rod 41. The secondary extension means is provided by admitting liquid to chamber G through a union 62 and passage 63 in the said piston rod. The air chamber F is replenished through a valve 64.

Figure 4 shows a motor which resembles that in Figure 8, except that the functions of the chambers F and G are reversed, chamber F receiving liquid for shortening the motor in cases of emergency through the union 65, whilst G is the air chamber, the inflation valve 66 for which is carried on the cylinder head 42, and connected to the chamber G by a passage 67 in the piston rod 41.

Figure 5 is a diagram of a liquid pressure operating system for controlling a fluid pressure motor according to the invention, the motor shown in the figure being similar to that shown in Figure 2.

In the system illustrated in Figure 5, a pump 82 draws liquid from a reservoir 83, and feeds it to a control valve 84. The two alternative outlets from the control valve 84 are coupled to the two ends of a locking valve 85, from which pipes 86 and 87 lead to the interconnected chambers F and G of the motor, and to the chamber D respectively. The locking valve 85 comprises a piston 90 normally held in the longitudinal centre of the valve chamber by balanced springs 91. The piston has two end sealing portions 92 and a central sealing portion 93, and two annular grooves 94 separating the sealing portions. Each end sealing portion 92 carries two sealing rings 95, and the central sealing portion carries a single sealing ring 96. In the central position of the valve piston the ports 97, 100 communicating with pipes 86, 87 are each between the sealing rings on one of the end sealing portions, so that the motor is hydraulically locked in position. Liquid entering either end of the valve from the control valve 84 moves the piston 90 longitudinally, until the adjacent end sealing portion moves away from the corresponding outlet, and liquid can flow to the motor.

To shorten the motor, the control valve is set to admit liquid to the right-hand end of the locking valve 85, thus moving the valve piston 90 until the liquid flows through the port 97 and pipe 86 to the chambers F and G in the motor. This exposes the port 100 to the annular space 94, from which liquid can flow through the port 101 to the interior of the piston 90 and back to the control valve 84 and reservoir 83. This permits any oil which may be in the chamber D to escape to the reservoir.

To extend the motor, the control valve is set to admit liquid to the left-hand end of the locking valve 85. This moves the valve piston 90 to the right, exposing the port 97 to the corresponding annular groove 94 in the valve piston, and the port 100 to the other end of the valve chamber. As soon as the port 97 is exposed, liquid can escape from the chambers F and G of the motor, and the air in chamber E can expand to produce extension. In order to ensure a free flow of liquid from the chambers F and G, to permit rapid extension of the motor, the ports 97, 100 are spaced at a less distance apart than the centres of the sealing heads 92 of the valve piston. As a consequence of this the outlet port is always opened before the inlet, and a free outflow takes place. In order that rapid extension may not produce a vacuum in chamber D of the motor, a pipe 102 may be provided between the pipe 87 adjacent the port 100, and the reservoir 83, a lightly loaded one way valve 103 being fitted in the pipe so that liquid may be drawn from the reservoir through this pipe, but cannot be returned therethrough.

If the air pressure in the motor has been lost, the pump will continue to pump liquid through the port 100 and pipe 87 to extend the motor.

The motor according to the invention may be employed for the operation of retractable undercarriages for aircraft, whether of forward, backward or sideways retracting type, and may be applied in all forms of operating linkage, whether to produce a breaking moment between two parts of a folding element, or to move the joint of a folding strut towards or away from a fixed point, or to produce a direct turning moment on an undercarriage component about an axis of retraction.

It may also be employed for the operation of such units as bomb hoists, fairing doors, landing flaps, and all other movable units on aircraft and for other applications.

What I claim is:

A fluid pressure motor comprising a cylinder, a plunger in the cylinder, said cylinder and plunger forming a link of variable length between members to be moved toward and away from each other, said plunger including a hollow stem of less diameter than the cylinder and a head, a rod mounted internally on said cylinder and projecting within said hollow plunger stem, a piston on said rod fitting within said plunger stem, said plunger head dividing the cylinder into two separate chambers, and said piston dividing the hollow plunger stem into two separate chambers, one chamber in said cylinder and one chamber in said plunger stem being adapted to increase in volume as the plunger of the motor moves relative to the cylinder in one direction, and the other chamber in said cylinder and the other chamber in said plunger stem being adapted to increase in volume when the plunger of the motor moves relative to the cylinder in the other direction, means for supplying fluid pressure to certain of said first mentioned chambers to move the plunger of the motor relative to the cylinder in one direction, gas contained in one of said second mentioned chambers which is compressed during said movement to store up energy for moving the plunger in the other direction, and means for supplying fluid pressure to the other of said second mentioned chambers to operate the motor in the event of failure of the gas pressure.

JOHN HENRY ONIONS.